United States Patent [19]

Fearon et al.

[11] Patent Number: 4,699,836

[45] Date of Patent: Oct. 13, 1987

[54] FRAME FOR COMPOSITE PANEL STRUCTURE AND METHOD FOR USING SAME

[75] Inventors: William W. Fearon, Worthington; Laurence L. Eberhart, Dublin; Rick G. Millspaugh, Powell; Larry B. Holben, Dublin, all of Ohio

[73] Assignee: Peabody Noise Control, Inc., Dublin, Ohio

[21] Appl. No.: 822,112

[22] Filed: Jan. 24, 1986

[51] Int. Cl.[4] .............................................. B32B 3/12
[52] U.S. Cl. ........................................ 428/73; 52/806; 156/304.1; 428/116; 428/192
[58] Field of Search .................... 52/273, 586, 806; 160/392; 156/292, 304.1, 304.5; 428/116, 117, 192, 73

[56] References Cited

U.S. PATENT DOCUMENTS

| | | | |
|---|---|---|---|
| 3,249,659 | 5/1966 | Voelker | 428/117 X |
| 3,934,382 | 1/1976 | Gartung | 52/144 |
| 3,963,094 | 6/1976 | Nowikas | 52/144 X |
| 4,004,387 | 1/1977 | Ellingson | 52/586 X |
| 4,053,008 | 10/1977 | Baslow | 52/273 X |
| 4,084,367 | 4/1978 | Saylor et al. | 428/116 X |
| 4,106,878 | 8/1978 | Jones | 52/664 X |
| 4,194,313 | 3/1980 | Downing | 428/116 X |
| 4,213,516 | 7/1980 | Sulewsky | 428/156 X |
| 4,426,760 | 1/1984 | Watts | 160/392 X |
| 4,522,284 | 6/1985 | Fearon et al. | 428/116 X |
| 4,625,490 | 12/1986 | Baslow | 160/392 X |
| 4,641,726 | 2/1987 | Fearon et al. | 428/116 X |

Primary Examiner—Henry F. Epstein
Attorney, Agent, or Firm—St. Onge Steward Johnston & Reens

[57] ABSTRACT

A frame is provided for mounting on a molded fiberglass-honeycomb composite panel structure, said frame comprising an elongated, substantially U-shaped member having a top and a bottom wall joined by an end wall to form a lengthwise channel for receiving the edge of said panel, the end wall being convex away from the channel, whereby the panel edge is restrained from deformation and a plurality of panels having the frame mounted on the edge thereof can be placed in an edge-to-edge abutting relationship to provide snug joints therebetween. Further provided is a composite panel structure with such a frame mounted thereon. Also further provided is a process for applying a relatively thin, flexible sheet onto such a composite panel structure using the frame of the present invention.

22 Claims, 9 Drawing Figures

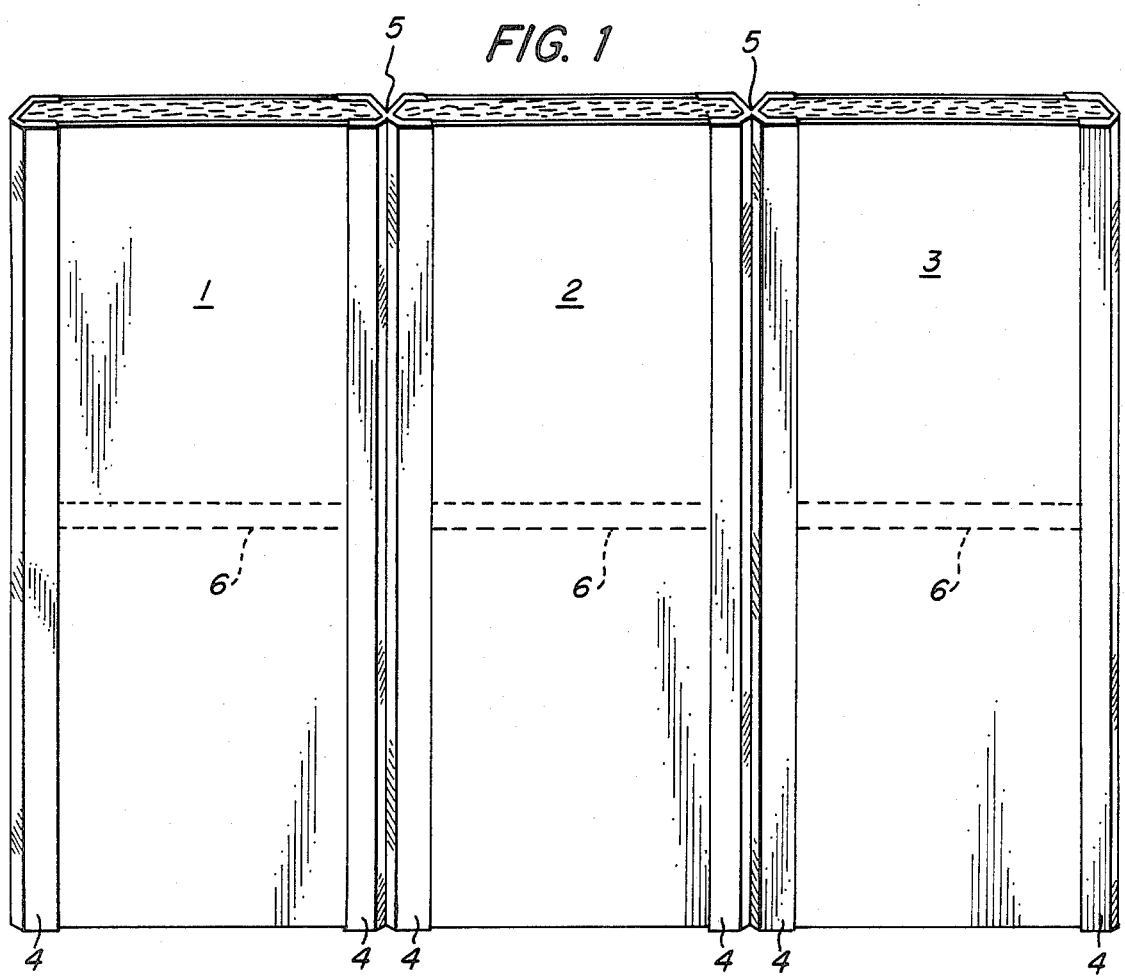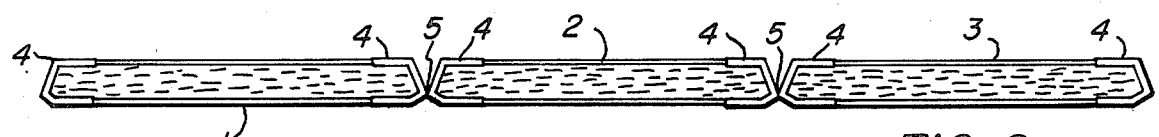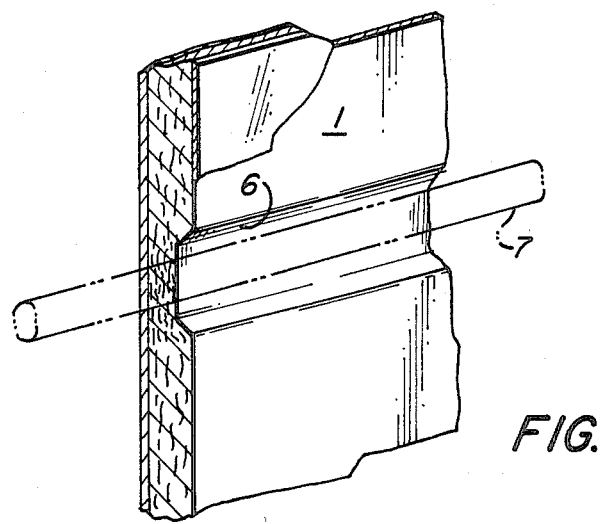

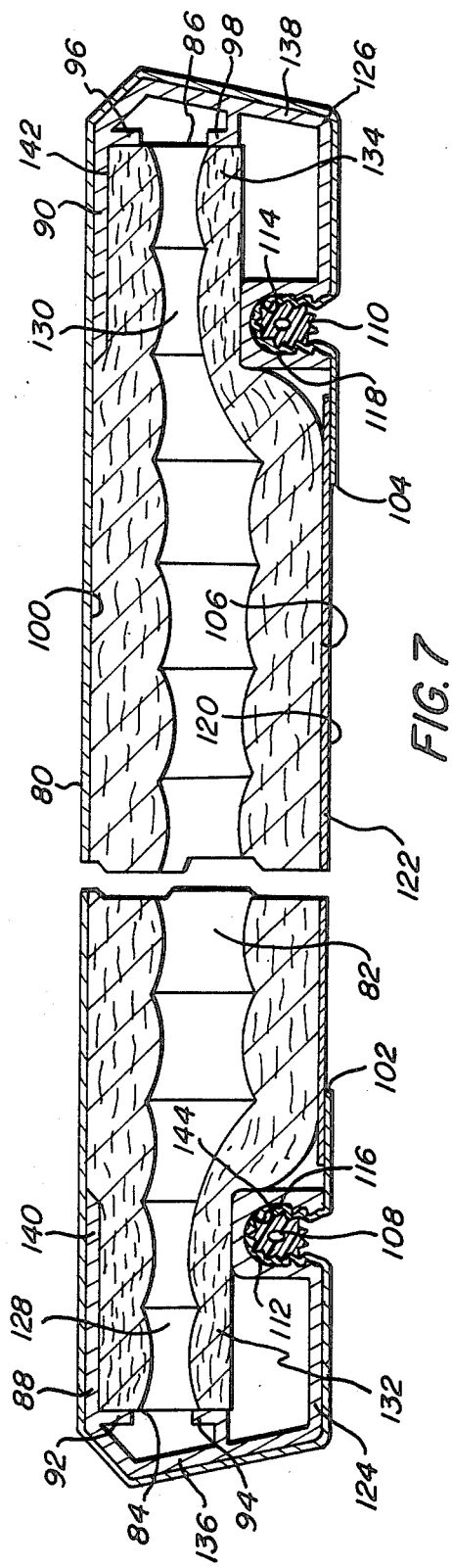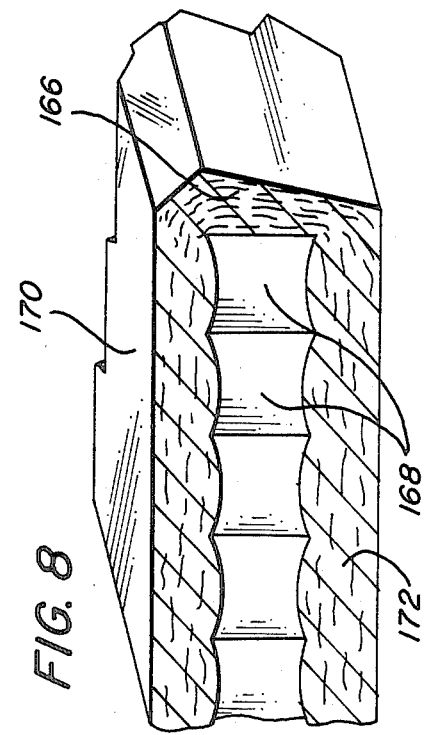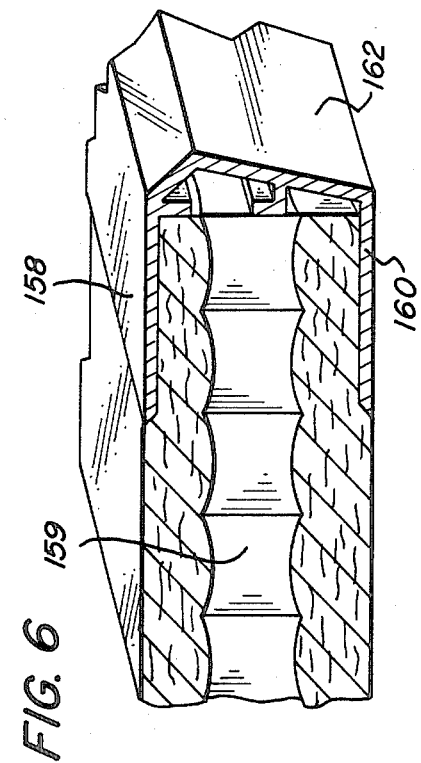

FRAME FOR COMPOSITE PANEL STRUCTURE AND METHOD FOR USING SAME

BACKGROUND OF THE INVENTION (1) Field of the Invention:

This invention relates to a frame for mounting on an edge of a composite panel structure, said panel structure comprising a honeycomb core having acoustically semi-transparent front and rear facings of fibrous material bonded thereto. More particularly, a frame is provided comprising an elongated, substantially U-shaped member having a top wall for abutting the front facing, an end wall joined to the top wall for abutting the edge, and a bottom wall joined to the end wall for abutting the rear facing. The bottom wall may have formed therein an elongated lengthwise keyway means for receiving a key means, whereby a relatively thin sheet covering can be extended over the composite panel structure and secured thereto by grippingly engaging portions of said sheet covering in said keyway means by inserting said key means therein. Also provided is a method for using said frame on said composite panel structure to reinforce said edge and to removably cover said panel structure with a thin sheet covering.

(2) Description of the Prior Art:

Composite panel structures having a cellular core and acoustically semi-transparent facings are known in the art. U.S. Pat. No. 4,522,284 to Fearon et al. discloses such a molded fiberglass-honeycomb composite panel structure, which is manufactured and sold by Peabody Noise Control, Inc. of Dublin, Ohio.

As set forth in detail in U.S. Pat. No. 4,522,284, the composite panel structure can take a number of different forms. In a particularly preferred form, this panel comprises first and second facings of fibrous material, such as a fiberglass mat having a binder material therein, bonded to both sides of a honeycomb core, typically a paper core. The panel is formed by heating and compressing a sandwich comprising in order (1) an uncured fibrous mat of relatively uniform thickness and density, (2) a honeycomb core, and (3) another mat. The binder material in the mats binds the fibrous material to the faces of the core, and the mats extend in pillow-like portions into the open cells of the core to provide a mechanical interlock between the facing and the core to supplement the bond created by the binder.

It is also known to provide an optional member around the outer perimeter of the panel structure, for reinforcement of the edges, as shown in FIG. 6 of U.S. Pat. No. 4,522,284. However, this optional member is molded into the structure during formation.

Such composite panel structures are typically used where noise attenuation is desirable. One example is the use of these strong, lightweight panels in appropriately sized sections as prefabricated space dividers in commercial buildings for dividing an interior space into work areas. Such prefabricated space dividers can be conveniently assembled, disassembled, and rearranged by a minimum workforce to provide work areas of easily changeable size and configuration having good sound attenuation properties for providing privacy within the building. Such panels may further be provided with soft exterior finishes, such as a carpeting or fabric covering, for further sound attenuation and improved aesthetics.

If such composite panel structures are used as space dividers without an adequate edge treatment, several problems may develop. First, while the panels are relatively lightweight and strong, the structures are easily distorted or deformed at the edges, where the fibrous material and the core are unprotected. Second, Because the edges are unprotected, it is difficult in placing two panels side-to-side to obtain a close joint therebetween, which reduces the privacy afforded by the panel system and is aesthetically displeasing. Third, the problems of obtaining adequate joints between panels is exacerbated if the panels are to be readily rearrangeable to change the configurations of the workspaces from time to time. Fourth, the changing of fabric coverings on the panels can be difficult and may lead to destruction of the panel surface, especially if adhesives are necessary to hold the fabrics or other coverings on the panels.

SUMMARY OF THE INVENTION

In accordance with the present invention, a frame is provided for mounting on a composite panel structure having front and rear surfaces terminating in a common edge, said frame comprising an elongated, substantially U-shaped member having top and bottom walls joined by an end wall, the top and bottom walls for abutting portions of the front and rear surfaces respectively and the end wall for abutting the edge. The end wall is convex away from the edge to provide a snug joint between a plurality of panels abutting each other in an edge-to-edge relationship along the edges having frames thereon. Aligning means are provided for aligning the end wall with the edge.

In a preferred embodiment of the present invention, the bottom wall has formed therein a lengthwise keyway means for receiving an elongated key means, said keyway means and key means for grippingly engaging a relatively thin, flexible sheet covering, which may be extended over the panel struc- ture.

Also provided is a process for applying a relatively thin, flexible sheet covering onto a composite panel structure, where portions of said structure adjacent two oppositely positioned edges are shaped to receive the frames of the present invention, the frames are positioned on the shaped portions, a covering sheet is extended over the panel structure, and said sheet is secured thereto on both edges by grippingly engaging the sheets in said keyway means with said key means.

It is an object of the present invention to provide a frame for mounting on the edge of a composite panel structure to increase the strength and rigidity of the panel around its perimeter.

It is a further object of the present invention to provide a frame for mounting on the edge of a composite panel structure that will increase the dimensional stability of the edge and will provide a uniform boundary for the panel, such that a plurality of panels each having the frame thereon can be placed in an edge-to-edge abutting relationship to provide a uniformly snug joint between said edges.

It is a further object of the present invention to provide a frame for mounting on the side of a composite panel structure that includes means for removably mounting a section of covering sheet thereon in a secure manner, while at the same time permitting the covering to be easily removed and replaced.

It is a further object of the present invention to provide a method for constructing a strong, lightweight composite panel structure having dimensionally stable edges that can be aligned with similarly configured panels to provide snug, aesthetically pleasing joints therebetween, said panel having a cloth or fabric covering thereon that can be conveniently changed.

BRIEF DESCRIPTION OF THE DRAWINGS

FIG. 1 is a perspective view of three composite panels having the frame of the present invention mounted on the edge thereof, said panels standing in an edge-to-edge abutting relationship;

FIG. 1A is a detailed view of that portion of one composite panel in FIG. 1 denoted by dotted lines showing a depression;

FIG. 2 is a top view of the panels of FIG. 1;

FIG. 6 is an end cross sectional view of a second embodiment of the frame of the present invention mounted on a composite panel structure;

FIG. 7 is a side cross sectional view of a composite panel structure having two frames and a covering sheet mounted thereon; and FIG. 8 is a perspective view of a composite panel structure having an edge formed in accordance with the method of the present invention.

DETAILED DESCRIPTION OF THE PREFERRED EMBODIMENT

Figure 3:
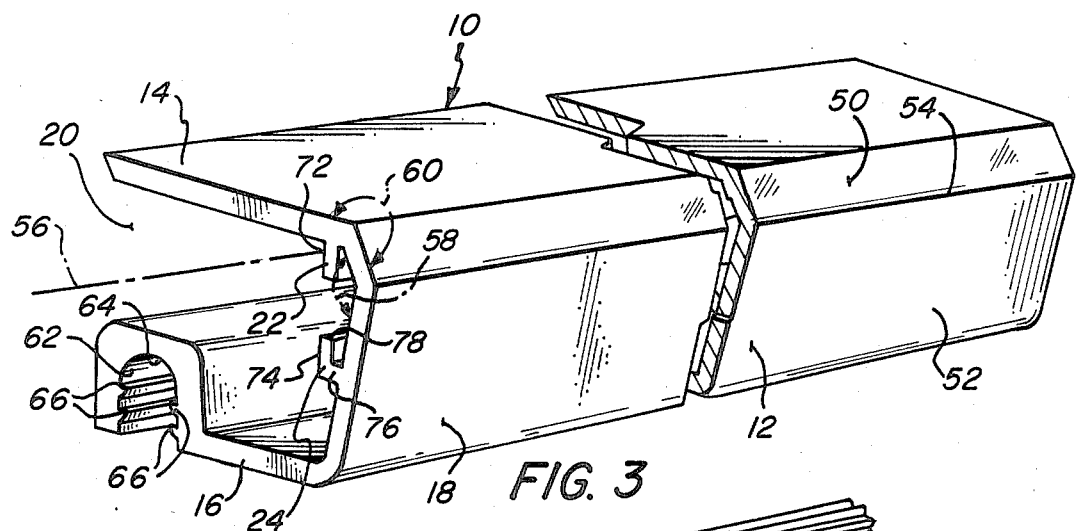
FIG. 3 is a perspective view of one embodiment of the frame of the present invention.

FIG. 1 shows three composite panel structures, indicated generally as 1, 2, and 3, positioned in an edge-to-edge abutting relationship in a manner that could be part of an office divider system if properly supported in a vertical plane by a substructure system not shown. Panels 1, 2, and 3 each have the frames of the present invention mounted on oppositely positioned edges, said frames being indicated generally by the numeral 4. FIG. 2 is a top view of the three panels 1, 2, and 3 shown in FIG. 1 with frames 4 thereon.

The composite panel structures shown in FIGS. 1 and 2 are particularly useful for constructing walls, such as for an office. Accordingly, it is particularly desirable to provide elongated depressions, indicated by the dotted lines 6, formed in the panel structure facing for fitting around pipes, conduits, or substructural members such as bracing. These depressions are particularly useful for accommodating electrical or fluid conduits in the manner depicted in FIG. 1A, where the reverse side of a section of panel 1 is shown with conduit 7 running along the depressions 6 formed in a portion of panel 1.

The present invention is best understood by reference to FIG. 3, where one embodiment of frame 4 is shown as indicated generally by numeral 10. The frame comprises an elongated, substantially U-shaped member 12 having a top wall 14, a bottom wall 16, and an end wall 18. In a preferred embodiment, these walls are on the order of 0.040 inches thick and are formed of extruded polyvinylchloride (PVC), which is particularly preferred because of its acceptable fire code rating. PVC provides adequate strength and rigidity with a sufficiently low weight per foot and low cost of materials, although other materials, such as for example polypropylene or nylon, could be used as well.

Figure 5:
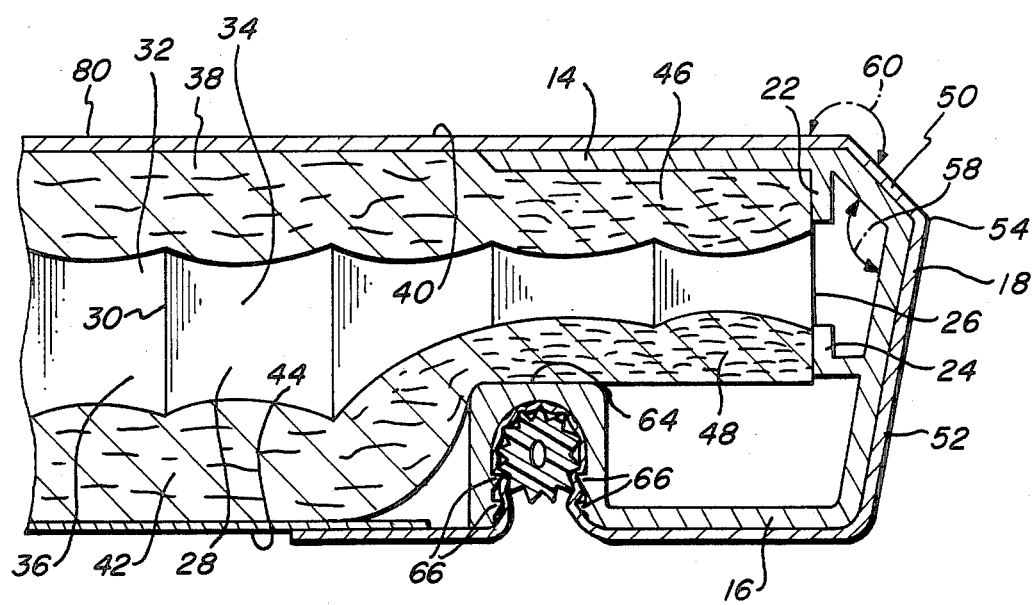
FIG. 5 is an end cross sectional view of the frame of FIG. 3 mounted on a composite panel structure with a covering sheet retained thereon by the spline member of FIG. 4.

As shown in FIG. 3, top and bottom walls 14 and 16 are joined by end wall 18 to form U-shaped member 12, and the top and bottom walls 14 and 16 face each other to form a lengthwise channel 20 opposite end wall 18 for receiving an edge 26 of a composite panel structure 28 as shown in cross section in FIG. 5.

Another feature of member 12 can be seen in detail in FIGS. 3 and 5, which show the end wall 18 being convex or angled away from channel 20 and the edge 26 of panel 28. As best seen in FIGS. 1 and 2, this is to permit a plurality of panels 1, 2, and 3 having the frames 4 of the present invention mounted on the edge thereof to abut each other along these edges to provide snug joints 5 therebetween. Because the frames 4 with convex edges are mounted on the panels, said panels abut one another along a much smaller surface area, theoretically abutting each other approximately along a line rather than a plane. This minimizes the effects of imperfections or distortions in the panels and permits a snug edge-to-edge fit, which not only is more aesthetically pleasing but is also more efficient to construct, because less time must be taken in positioning the panels to seal all the cracks between abutting panels.

In a particularly preferred embodiment, end wall 18 comprises a corner wall 50 joining top wall 14 and a side wall 52 joining bottom wall 16. Corner wall 50 and side wall 52 join each other along longitudinal path 54 that is closer to top wall 14 than to bottom wall 16. The U-shaped member 12 can be said to have a longitudinal axis 56 along which said member 12 extends, and along which the top wall 18, corner wall 50, side wall 52, and bottom wall 16 extend, preferably at a substantially uniform distance therefrom. The angle 58 defined by the conjunction of the plane of corner wall 50 and the plane of side wall 52, measured perpendicular to longitudinal axis 56, is obtuse. Under these conditions, end wall 18 is convex away from channel 20.

In a particularly preferred embodiment, the angle 60 defined by the conjunction of the plane defined by the corner wall 50 and the top wall 14 measured around the outside of member 12 in a plane perpendicular to the longitudinal axis is substantially 125°.

End wall 18 further comprises lengthwise ribs 22 and 24 for abutting an edge 26 of the composite panel structure 28 shown in FIG. 5. Ribs 22 and 24 project from end wall 18 inwardly in the direction of channel 20 and have surfaces 72 and 74 for mating with edge 26 to align the end wall 18 with respect to edge 26 along the length of member 12. Ribs 22 and 24 can likewise be any means for aligning end wall 18 with edge 26 that are positioned adjacent end wall 18 and extend along the length of member 12. Such aligning means permits a plurality of frames to be mounted on a plurality of panels placed in abutment along said edges to achieve consistent joints therebetween.

More particularly, in FIG. 3 rib 22 is positioned adjacent the junction of top wall 14 with corner wall 50 to extend inwardly in the direction of bottom wall 16 at substantially a right angle to top wall 14, when measured inside member 12 in a plane perpendicular to longitudinal axis 56 when member 12 is mounted on the edge of a panel, as shown in FIG. 5. Rib 24 is positioned on side wall 52 of end wall 18 between path 54 and the region where the side 52 joins the bottom wall 16. Rib 24 comprises an L-shaped member having one leg 76 joined along its end to side wall 52 and the other leg 78 aligned with rib 22, so that ribs 22 and 24 in combination align end wall 18 with edge 26.

Figure 4:
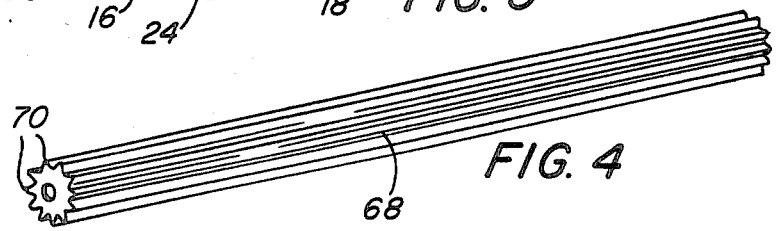
FIG. 4 is a perspective view of an elongated spline member for use with the frame of FIG. 3.

In the embodiment shown in FIG. 3, bottom wall 16 further has formed therein a keyway means 62 extending lengthwise in alignment with longitudinal axis 56 along said bottom wall 16. Keyway 62 is at a substantially uniform distance from end wall 18 and constitutes three substantially right angle bends in the bottom wall 16 at its end removed from end wall 18 to form a groove of substantially cylindrical cross section in the bottom wall 16. This groove or keyway 62 is formed in a portion 64 of said bottom wall 16 extending inwardly towards the top wall 14. It is this inwardly extending portion 64 of bottom wall 16 that abuts the rear facing 44 of panel 28 in the particular embodiment shown in FIGS. 3 and 5. Keyway 62 has tangs or barbs 66 formed therein along the length of said keyway 62 for retaining therein a corresponding elongated key means shown as an elongated spline member 68 in FIG. 4.

Spline member 68 is comprised of an extruded elastomer, is of a cross section corresponding to the keyway 62, here cylindrical, and is relatively flexible for pressing into keyway or groove 62. Spline member 68 has lengthwise ridges or fins 70 on the surface thereof for engaging said tangs or barbs 66 for retention inside groove 64. The keyway means 62 in conjunction with spline member 68 provides a means for grippingly engaging a relatively thin, flexible sheet, such as a fabric, that is stretched over the panel structure having the frame mounted thereon. The sheet is placed over said keyway 62 and the spline member 68 is pressed into keyway 62. Spline member 68 is retained therein and the sheet is gripped between spline member 68 and keyway 62. The use of a keyway means 62 in conjunction with key means 68 is explained more fully in detail below.

A second embodiment of the frame of the present invention is shown in FIG. 6. Frame 158 of FIG. 6, shown mounted on the edge of composite panel 159, is substantially the same as frame 10 of FIG. 3, except that the bottom wall 160 of frame 158 does not have a keyway or groove therein. As explained more fully in detail below, frame 158 is adapted for use on a composite panel structure 159 having a particular shape along its edges.

FIG. 5 shows member 12 mounted on the edge 26 of panel 28. Panel 28 comprises wall means 30 forming cells 32, such as a honeycomb core, said cells being open to a first side 34 and a second side 36 thereof. An acoustically semitransparent first or front facing 38 of fibrous material, such as 16 p.c.f. fiberglass containing a urea-or phenolformaldehyde binder, is bound to the first side 34 of the honeycomb core. The outer surface 40 of this first facing 38 is formed by heat and compression during manufacture of the panel structure 28 to be relatively hard. A similar second or rear facing 42 is bound to the second side 36 of the core to form a second or rear relatively hard outer surface 44.

As shown in FIG. 5, front surface 40 and rear surface 44 terminate in common edge 26. FIG. 5 shows panel 28 having shaped portions 46 and 48 adjacent edge 26. These shaped portions 46 and 48 are for permitting member 12 to be mounted thereon in a snug conforming fit so that the front surface 40 of the panel and the top wall 14 of member 12 provide a continuous, uninterrupted smooth surface where they join. Shaped portion 48 provides the same accommodation for the rear surface 44 and bottom wall 16. FIG. 6, as described above, shows a second embodiment of the frame of the present invention, mounted on another panel structure with a second configuration of shaped portions. As described more fully in detail below, shaped portions 46 and 48 can be formed by removing or routing portions of the front and rear surfaces after the panel has been formed or by compression of a portion of the panel structure near the edge during formation.

As seen in FIG. 5, edge 26 of panel 28 fits into channel 20 of member 12 and abuts end wall 18 along lengthwise ribs 22 and 24. Top wall 14 extends over and abuts shaped portion 46 and portion 64 of bottom wall 16 extends over and abuts shaped portion 48 to engage panel 28. As seen in FIG. 3, top wall 14 is curved slightly downwardly towards bottom wall 16, so that member 12 has a spring bias along its length for enabling the top and bottom walls 14 and 16 to grippingly engage panel 28 when mounted on edge 26. Also, an adhesive material such as No.66 contact adhesive by Minnesota Mining and Manufacturing Corporation may be placed between the top and bottom walls and the panel front and rear surfaces to further retain member 12 on panel 28.

As shown in FIG. 7, a covering sheet 80, such as a fabric, carpeting, perforated vinyl, or other desired covering, may be extended over at least a portion of a composite panel structure 82 similar to the panel structure 28 shown in FIG. 5. Panel structure 82 has a boundary delimited by at least one pair of opposite parallel edges 84 and 86. The panel is typically rectangular, or on the order of 4 feet by 8 feet and is of uniform thickness except at the edges, which may have shaped portions for receiving the frames of the present invention. Two lengths of frames 88 and 90, such as those shown above in FIG. 3, are mounted along at least a portion of both such edges, their respective ribs 92, 94, 96, and 98 being mated with edges 84 and 86 to align the frames. In the typical installation, the frames will be mounted completely along the opposing long edges of a 2, b 2½, or 4 foot by 9, 10, or 12 foot panel, as seen in FIG. 1. However, it is understood that the frames could alternatively be mounted along both ends. The relatively thin, flexible sheet 80 extends over the front surface 100 of panel 82 and extends over the top, end, and bottom walls of both frames 88 and 90 and terminates at points 102 and 104 on the rear surface 106. The sheet covering 80 is affixed to panel 82 on either side at frames 88 and 90 by the spline members 108 and 110 pressed into keyway means 112 and 114 with portions 116 and 118 of the covering 80 grippingly engaged therebetween.

In addition, at least a portion 120 of the rear surface 106 of panel 82 may be covered by a relatively thin metal foil 122, which serves as a heat, moisture, and sound barrier. This foil 122 is attached to rear surface 106 by an adhesive, such as pressure sensitive adhesive. Foil 122 preferably terminates either under or adjacent the bottom walls 124 and 126 of frames 88 and 90 and under the termination points 102 and 104 of sheeting covering 80.

In accordance with the present invention, a process is disclosed for applying a relatively thin, flexible sheet 80, such as fabric, carpeting, or vinyl onto the composite panel structure 82. The first step is to shape portions 128 and 130 of front and rear surfaces 100 and 106 to receive a frame or frames 88 and 90. Said shaped portions 128 and 130 are adjacent to and in alignment with edges 84 and 86 of panel 82, usually consisting of a strip along the edge of the panel for a length determined by the length of the frame to be mounted.

Shaping said portions 128 and 130 can be achieved in several ways. First, said portions of the front and rear surfaces may be cut away or removed, such as by routing. An example of such removal is shown in FIG. 6. Alternatively, as shown in FIGS. 5 and 7, the front surface 100 may be routed along the edges, while the rear surface 106 may have compressed portions 132 and 134 formed by compression of the honeycomb core and the rear facings adjacent the edge during the formation of the composite panel structure. Such a compressed portion is useful when a frame having the configuration shown in FIG. 3 is used.

After shaped portions 128 and 130 have been prepared, then sections of frames 88 and 90 configured as described above are precut to lengths corresponding to the composite panel structure and are positioned onto edges 84 and 86 having shaped portions 128 and 130. The frames 88 and 90 are aligned on the edges 84 and 86 until end walls 136 and 138 abut edges 84 and 86 and the top and bottom walls 140, 124, 142, and 126 abut the shaped front and rear surfaces 100 and 106 in a snug conforming fit. The section of covering sheet 80 is then positioned in alignment over front surface 100, sheet 80 being of a shape, size and design corresponding to the panel to be covered. Sheet 80 is also large enough to extend around said frames 88 and 90 at least over bottom walls 124 and 126 to terminate at 102 and 104. That portion of the sheet 80 extending at least as far as to the bottom wall portions is then affixed to the bottom wall and/or the rear surface.

If the frame configuration shown in FIG. 3 is used, then the covering sheet 80 is affixed by aligning a first portion of sheet 80 over keyway 144 in bottom wall 124. Spline member 108, or any suitable elongated key means, is then pressed into keyway 144 along the length of frame 88. That portion of sheet 80 over the keyway is carried therein and is grippingly retained by key means 108. The process is then repeated at the opposite edge 86 after the sheet is extended over the front surface and stretched sufficiently thereover.

Another embodiment of the present invention is shown in FIG. 8. No frames are used with the composite panel structure of FIG. 8; instead, the panel has at least two opposing edges, one edge being indicated as 166 in FIG. 8. Edge 166 is formed by compression of the fibrous mats and a binder to such an extent that a relatively hard edge of fibrous material and binder is formed. This edge 166 has a cross-sectional area that is convex away from panel 168 in substantially the same shape as the frames discussed in detail above. Accordingly, a plurality of these panels can fit together in a side-to-side snugly abutting relationship, just as is depicted for the frame bearing panels in FIGS. 1 and 2 above. Fabric can be placed on front surface 170 by use of adhesives, and likewise foil can be placed on rear surface 172.

It is to be understood that various changes and modifications of the preferred methods and embodiments described above will be apparent to those skilled in the art. Such changes and modifications can be made without departing from the spirit and scope of the present invention, and it is therefore intended that such changes and modifications be covered by the following claims.

We claim:

1. A frame for mounting on a composite panel structure, said panel comprising a honeycomb core having means forming cells open to a first side and a second side thereof, an acoustically semi-transparent front facing of fibrous material and a binder formed to provide a relatively hard outer surface, said front facing being bonded to said first side of the core, and an acoustically semi-transparent rear facing of fibrous material and a binder formed to provide a relatively hard outer surface, the rear facing being bonded to said second side of the core, whereby said panel has front and rear surfaces, said front and rear surfaces terminating in a common edge, said frame comprising an elongated, substantially U-shaped member having a top and a bottom wall joined by an end wall, the top and bottom walls facing each other and forming a lengthwise channel opposite said end wall for receiving said edge of said panel, said end wall for abutting said edge and said top and bottom walls for extending over portions of the front and rear surfaces respectively to engage said panel, said end wall further being convex away from said channel, whereby said edge is restrained from deformation and a plurality of panels having the frame mounted on the edge thereof can be placed in an edge-to-edge abutting relationship to provide snug joints therebetween.

2. The frame of claim 1, further comprising means for aligning said end wall with said edge, said aligning means being positioned adjacent said end wall and extending along said member, whereby said plurality of panels have consistent joints therebetween.

3. The frame of claim 2, wherein the aligning means comprises at least two ribs extending lengthwise along said member, said ribs projecting from the end wall inwardly in the direction of said channel, said ribs having means for mating with said edge to align said end wall with respect to said edge along the length of said member.

4. The frame of claim 3, wherein the U-shaped member has a longitudinal axis along which said member extends, and the end wall comprises a corner wall joining the top wall and a side wall joining the bottom wall, said corner and side walls joining each other along a path closer to said top wall than to said bottom wall, and the angle defined by the corner wall and the side wall measured inside said member in a plane perpendicular to said axis is obtuse, whereby said plurality of panels are for joining each other along said paths.

5. The frame of claim 4, wherein the angle defined by the corner wall and the top wall measured around the outside of said member in a plane perpendicular to said axis is substantially 125°.

6. The frame of claim 5, wherein a first lengthwise rib is positioned adjacent the junction of the top wall with the corner wall to extend inwardly at substantially a right angle to said top wall inside said member in a plane perpendicular to said axis when said molding is mounted on said panel, and a second lengthwise rib is positioned on the side wall between said path and the junction of the side wall with the bottom wall, and said second rib comprises an L-shaped member, one leg of which is joined at its end to the side wall and the other leg of which is aligned with said first rib, whereby said ribs in combination align said end wall with said edge.

7. The frame of claim 6, wherein said top wall is curved downwardly toward said bottom wall, whereby the U-shaped member has a spring bias enabling said top and bottom walls to grippingly engage said panel when mounted on the edge thereof.

8. The frame of claim 7, wherein said bottom wall further has formed therein a lengthwise keyway extending along said bottom wall at a uniform distance from said end wall, said keyway for receiving therein a corresponding elongated key means, said keyway having means for retaining said key means therein, whereby a relatively thin, flexible sheet can be grippingly engaged by said keyway and key means by placing said sheet over said keyway and pressing said key means into said keyway to retain said key means and grip said sheet between said key means and said keyway.

9. The frame of claim 8, wherein said bottom wall further comprises a portion extending inwardly toward the top wall, and said keyway comprises a lengthwise groove of substantially circular cross section formed in said inwardly extending portion, and said key means comprises an elongated, flexible spline member of substantially cylindrical cross section for pressing into said groove.

10. A composite panel structure with a frame mounted on at least one edge thereof, the structure comprising:
   (a) a honeycomb core having means forming cells open to a first side and a second side thereof;
   (b) an acoustically semi-transparent front facing of fibrous material and a binder formed to provide a relatively hard outer surface, the front facing being bonded to said first side of the core;
   (c) an acoustically semi-transparent rear facing of fibrous material and a binder formed to provide a relatively hard outer surface, the rear facing being bonded to said second side of the core, whereby said panel has front and rear facings with relatively hard outer surfaces, said facings and core terminating in at least one common edge defined by said cell means;
   (d) a frame mounted in a snug, conforming fit along a portion of said edge, said frame comprising an elongated, substantially U-shaped member having a top and a bottom wall joined by an end wall, said top and bottom walls forming a lengthwise open channel opposite said end wall for receiving said edge, said top wall extending over and abutting a portion of said front facing, said bottom wall extending over and abutting a portion of said bottom wall, and said end wall abutting said edge, said end wall further being convex away from said edge, whereby a plurality of panel structures having the frame mounted on an edge thereof can be placed in an edge-to-edge abutting relationship to provide snug joints therebetween.

11. The composite panel structure of claim 10, wherein said end wall comprises a corner wall joined to the top wall and a side wall joining the bottom wall, said corner and side walls joining each other along a path closer to said top wall than to said bottom wall, and the angle between the corner wall and the side wall measured inside the member and in a plane perpendicular to a longitudinal axis of said member is obtuse, whereby said plurality of panels can snugly join each other along said path.

12. The composite panel structure of claim 11, wherein the panel structure has a boundary delimited by at least one pair of opposite parallel edges, and the frame is mounted along at least a portion of both said edges, the panel structure further having a relatively thin, flexible sheet extending over at least a portion of the front surface and both frames, said covering being affixed to the panel at the frame on both sides by means for securing said sheet to the bottom walls of said both frames.

13. The composite panel structure of claim 12, where at least a portion of the rear surface of the panel is further covered by a relatively thin, metal foil attached to the rear surface by adhesive means, and the foil terminates under and adjacent to the bottom walls of both frames, and the said sheet comprises a fabric.

14. The composite panel structure of claim 12, wherein the securing means comprises a lengthwise keyway means formed in said bottom wall and extending along said bottom wall at a uniform, preselected distance from said end wall, said keyway means being adapted for receiving therein an elongated key means, said keyway means having means for retaining said key means therein, whereby said sheet can be grippingly engaged on said bottom wall by placing said sheet over said keyway means and then pressing said key means into said keyway means to thereby retain said sheet between said keyway means and said key means.

15. The composite panel structure of claim 10 for placing adjacent an electrical or fluid conduit means, wherein at least one of said facings forms at least one means for fitting said structure adjacent said conduit means.

16. The composite panel structure of claim 15, wherein said fitting means comprises at least one elongated depression formed in said facing.

17. A process for applying a relatively thin, flexible sheet onto a composite panel structure comprising a honeycomb core having means forming cells open to a first side and a second side thereof, an acoustically semi-transparent front facing of fibrous material and a binder formed to provide a relatively hard outer surface, said front facing being bonded to said first side of the core, and an acoustically semi-transparent rear facing of fibrous material and a binder formed to provide a relatively hard outer surface, the rear facing being bonded to said second side of the core, said front and rear facings terminating in a boundary delimited by at least two oppositely positioned edges, the process comprising:
   (a) shaping portions of the front and rear facings adjacent and in alignment with said two edges of the panel structure to receive a frame;
   (b) positioning frames onto both shaped edges, one frame on each edge, said frame comprising an elongated, substantially U-shaped member having a top and a bottom wall joined by an end wall, said top and bottom walls forming a lengthwise open channel opposite said end wall for receiving said edge, said end wall being convex away from said channel;
   (c) aligning said frame thereon until said end wall abuts said edge and said top and bottom walls abut the shaped front and rear facings respectively in a snug conforming fit into said shaped portions, wherby a plurality of such panels having the frame mounted on the edges thereof can abut each other along said edges to provide a snug joint therebetween;
   (d) positioning a section of relatively thin, flexible covering sheet in alignment over the front facing of the panel, said sheet having a shape corresponding to the panel to be covered and being of a size sufficient to extend around said frame at least over the bottom walls of said frames; and
   (e) affixing that portion of the sheet extending over the bottom wall portions to the rear facing and the bottom wall portion of the frame.

18. The process of claim 17, wherein said bottom wall further has formed therein a lengthwise keyway extending along said bottom wall at a uniform distance from said end wall, said keyway adapted for receiving therein a corresponding elongated key means, said keyway having means for retaining said key means therein, the process further comprising the steps of:

(a) aligning a first portion of said sheet over the keyway in the bottom wall of the frame on a first edge of said panel structure;

(b) pressing a first elongated key means into the keyway along the length of said frame, whereby said portion of said sheet over the keyway is carried into said keyway and is grippingly retained therein by said key means within said keyway;

(c) extending the sheet covering over the end and top walls of said frame mounted on said first edge, over the front facing of said panel, over the top and end walls of the frame mounted on a second edge of said panel structure;

(d) aligning a second portion of said sheet over the keyway in the bottom wall of the frame on the second edge of said panel structure; and (e) pressing a second elongated key means into the keyway along the length of said molding, whereby said portion of said sheet over the keyway is carried into said keyway and is grippingly retained therein by said key means within said keyway.

19. The process of claim 18, wherein said shaped portion of the front and rear facings is formed by removing portions of said facings.

20. The process of claim 18, wherein said shaped portions are formed by compression during the formation of the composite panel structure.

21. The process of claim 18, wherein the frame comprises extruded polyvinylchloride and the sheet covering comprises a fabric.

22. An acoustic panel structure for use in constructing removable modular compartments, the panel comprising:

(a) a honeycomb core having means forming cells open to a first side and a second side thereof;

(b) an acoustically semi-transparent front facing of fibrous material and a binder formed to provide a relatively hard outer surface, the front facing being bonded to said first side of the core;

(c) an acoustically semi-transparent rear facing of fibrous material and a binder formed to provide a relatively hard outer surface, the rear facing being bonded to said second side of the core, whereby said panel has front and rear facings with relatively hard outer surfaces;

(d) said panel having at least two parallel edges spaced on opposite sides of said panel, said edges being formed by the compression of fibrous material and a binder to form a relatively hard edge, said edge having a crosssectional area that is convex away from said panel, so that a plurality of panels having said edge can abut each other along said edges to provide snug joints therebetween;

(e) a fabric sheet extending over the front facing and covering the entire front surface, said fabric extending over said edges onto a portion of the rear facing; and (f) a foil sheet extending over the rear facing and terminating under the fabric sheet where it extends to the rear facing.

* * * * *